US009985898B2

(12) United States Patent
Ramaiah et al.

(10) Patent No.: US 9,985,898 B2
(45) Date of Patent: May 29, 2018

(54) SYSTEM FOR BANDWIDTH OPTIMIZATION WITH TRAFFIC PRIORITY DETERMINATION

(71) Applicant: Citrix Systems, Inc., Fort Lauderdale, FL (US)

(72) Inventors: Chaitra Maraliga Ramaiah, Karnataka (IN); Praveen Raja Dhanabalan, Tamil Nadu (IN)

(73) Assignee: Citrix Systems, Inc., Fort Lauderdale, FL (US)

( * ) Notice: Subject to any disclaimer, the term of this patent is extended or adjusted under 35 U.S.C. 154(b) by 26 days.

(21) Appl. No.: 14/632,848

(22) Filed: Feb. 26, 2015

(65) Prior Publication Data

US 2016/0255009 A1     Sep. 1, 2016

(51) Int. Cl.
| | |
|---|---|
| *H04L 12/26* | (2006.01) |
| *H04L 12/807* | (2013.01) |
| *H04L 29/06* | (2006.01) |
| *H04L 12/801* | (2013.01) |
| *H04L 12/875* | (2013.01) |
| *H04L 12/851* | (2013.01) |

(52) U.S. Cl.
CPC .............. *H04L 47/27* (2013.01); *H04L 47/11* (2013.01); *H04L 47/12* (2013.01); *H04L 47/193* (2013.01); *H04L 47/2433* (2013.01); *H04L 47/56* (2013.01); *H04L 69/16* (2013.01)

(58) Field of Classification Search
CPC ............. H04L 41/0213; H04L 43/0894; H04L 41/0893; H04L 47/27; H04L 47/41; H04L 47/27193; H04L 47/196; H04L 47/2441; H04L 47/11; H04L 47/12; H04L 47/56; H04L 47/193; H04L 47/2433
USPC .... 370/229, 230.1, 231, 232, 235, 237, 230; 709/220, 223
See application file for complete search history.

(56) References Cited

U.S. PATENT DOCUMENTS

| | | | |
|---|---|---|---|
| 8,214,707 B2 | 7/2012 | Munson et al. | |
| 9,014,264 B1* | 4/2015 | Cheng | H04L 47/12 375/240.05 |
| 2002/0150048 A1 | 10/2002 | Ha et al. | |
| 2004/0184414 A1* | 9/2004 | Ohki | H04L 47/10 370/260 |
| 2008/0144503 A1 | 6/2008 | Persson et al. | |
| 2008/0144504 A1 | 6/2008 | Marcondes | |
| 2008/0144511 A1 | 6/2008 | Marcondes | |
| 2008/0144663 A1 | 6/2008 | Johnson et al. | |
| 2009/0113048 A1 | 4/2009 | Maze et al. | |
| 2009/0279429 A1 | 11/2009 | Griffoul | |
| 2009/0316581 A1 | 12/2009 | Kashyap et al. | |
| 2010/0246398 A1 | 9/2010 | Chiang | |
| 2011/0249553 A1 | 10/2011 | Wang et al. | |

(Continued)

*Primary Examiner* — Harun Chowdhury
(74) *Attorney, Agent, or Firm* — Foley & Lardner LLP; Christopher J. McKenna

(57) ABSTRACT

A system for optimizing network traffic is described. The system includes a transport communication protocol (TCP) controller configured to acquire data regarding a flow of a plurality of data packets over a link and to determine TCP characteristics for the flow, a traffic prioritization module configured to assign a flow priority to the flow, and a traffic priority controller configured detect congestion on the link and determine a congestion window size for the flow based on the flow priority and the TCP characteristics.

18 Claims, 8 Drawing Sheets

(56) References Cited

U.S. PATENT DOCUMENTS

| | | |
|---|---|---|
| 2012/0106342 A1* | 5/2012 | Sundararajan ........ H04L 47/193 |
| | | 370/235 |
| 2013/0163428 A1 | 6/2013 | Lee |
| 2013/0223254 A1 | 8/2013 | Oguchi |
| 2013/0297743 A1 | 11/2013 | Eschet et al. |
| 2014/0189074 A1* | 7/2014 | Parker ................. H04L 41/0893 |
| | | 709/220 |
| 2014/0289383 A1 | 9/2014 | Draznin et al. |
| 2015/0036500 A1 | 2/2015 | Williams et al. |
| 2015/0043339 A1 | 2/2015 | Wang et al. |
| 2015/0117208 A1 | 4/2015 | Radulescu et al. |
| 2015/0188830 A1 | 7/2015 | Zhao |
| 2016/0255004 A1 | 9/2016 | Ramaiah et al. |

* cited by examiner

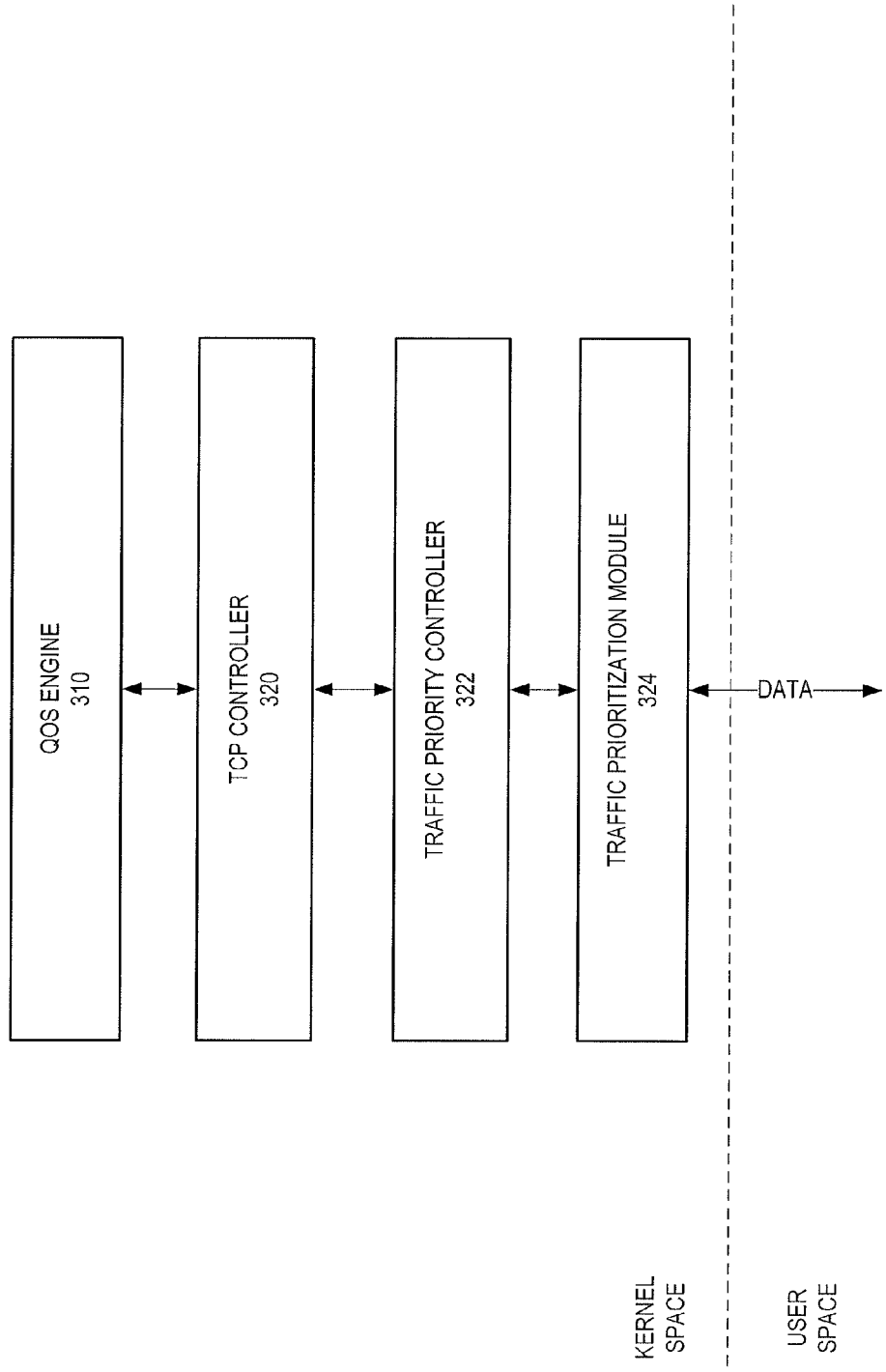

SYSTEM FOR BANDWIDTH OPTIMIZATION WITH TRAFFIC PRIORITY DETERMINATION

BACKGROUND

A middlebox is a network appliance that manipulates internet traffic by optimizing data flow across the network. Middleboxes can be configured as wide area network ("WAN") optimizers and can be deployed in pairs across two geographically separated locations to optimize data traffic between the two middleboxes. Middleboxes can be connected through a single link or multiple links such as a leased line link and a broadband link. Middleboxes use TCP congestion avoidance algorithms, commonly called "TCP flavors," to optimize TCP data flows as part of a quality of service ("QoS") scheme. Common examples of TCP avoidance flavors can include algorithms such as TCP Vegas, TCP Reno, TCP NewReno, TCP Hybla, TCP BIC, and TCP CUBIC, among others. Each TCP congestion avoidance flavor is suited for optimizing data flows originating from or received by particular operating systems, link types, and/or other network characteristics.

Some TCP flavors improve quality of service across TCP connections by using congestion control and congestion avoidance techniques that sometimes include TCP traffic prioritization. Traffic prioritization, a traffic shaping technique for Quality of Service (QoS), can ensure that more packets from very high priority (P1) traffic are pushed into the network for increased throughput. Thus when there are enough data to be sent from both P1 and non-high priority (non-P1) traffic, the prioritization functionality of QoS can push more packets from P1 traffic into the network pipe thereby delivering better throughput and providing enhanced QoS for P1 traffic. For example, using conventional methods of prioritization, if traffic prioritization module dictates 3:1 ratio for P1 and non-P1 traffic, we could expect approximately 75% of the packets occupying the leased network pipe to be of P1 traffic.

One down side of conventional prioritization techniques is when the network link gets congested, since there are more packets from the P1 traffic, the probability of packet drops from P1 traffic is much higher than the probability of packet drops in non-P1 traffic. For example, in one congestion scenario, the probability of next packet drop to occur in P1 traffic would be 0.75 as opposed to non-P1 traffic with a probability of 0.25. Thus, using conventional traffic prioritization techniques, P1 traffic could get multiple packet drops, which in turn forces the TCP connection to reduce its congestion window. Therefore, the higher priority TCP traffic can experience reduced throughput and degraded end-to-end QoS.

SUMMARY

In some aspects, a system for optimizing network traffic is described. The system includes a transport communication protocol (TCP) controller configured to acquire data regarding a flow of a plurality of data packets over a link and to determine TCP characteristics for the flow, a traffic prioritization module configured to assign a flow priority to the flow, and a traffic priority controller configured detect congestion on the link and determine a congestion window size for the flow based on the flow priority and the TCP characteristics.

In another aspect, a method for optimizing network traffic is described. The method can include acquiring data regarding a flow of a plurality of data packets over a link, determining transport communication protocol (TCP) characteristics for the flow, assigning a flow priority to the flow, detecting congestion on the link, and determining a congestion window size for the flow based on the flow priority and the TCP characteristics.

In yet another aspect, non-transitory computer readable storage medium is described. The storage medium stores a set of instructions that are executable by at least one processor of an appliance to cause the appliance to perform a method for optimizing network traffic. The method can include acquiring data regarding a flow of a plurality of data packets over a link, determining transport communication protocol (TCP) characteristics for the flow, assigning a flow priority to the flow, detecting congestion on the link, and determining a congestion window size for the flow based on the flow priority and the TCP characteristics.

BRIEF DESCRIPTION OF THE DRAWINGS

Reference will now be made to the accompanying drawings showing example embodiments of this disclosure. In the drawings:

FIG. 3B is a block diagram of a portion of an exemplary appliance illustrated in FIG. 3A, consistent with embodiments of the present disclosure.

DETAILED DESCRIPTION

Reference will now be made in detail to the exemplary embodiments implemented according to the present disclosure, the examples of which are illustrated in the accompanying drawings. Wherever possible, the same reference numbers will be used throughout the drawings to refer to the same or like parts.

The embodiments described herein provide TCP network bandwidth optimization using traffic prioritization determination. The prioritization of TCP network traffic can avoid or mitigate network congestion for high priority traffic and improve the efficiency of the network data flow through optimization of the bandwidth.

Figure 1:
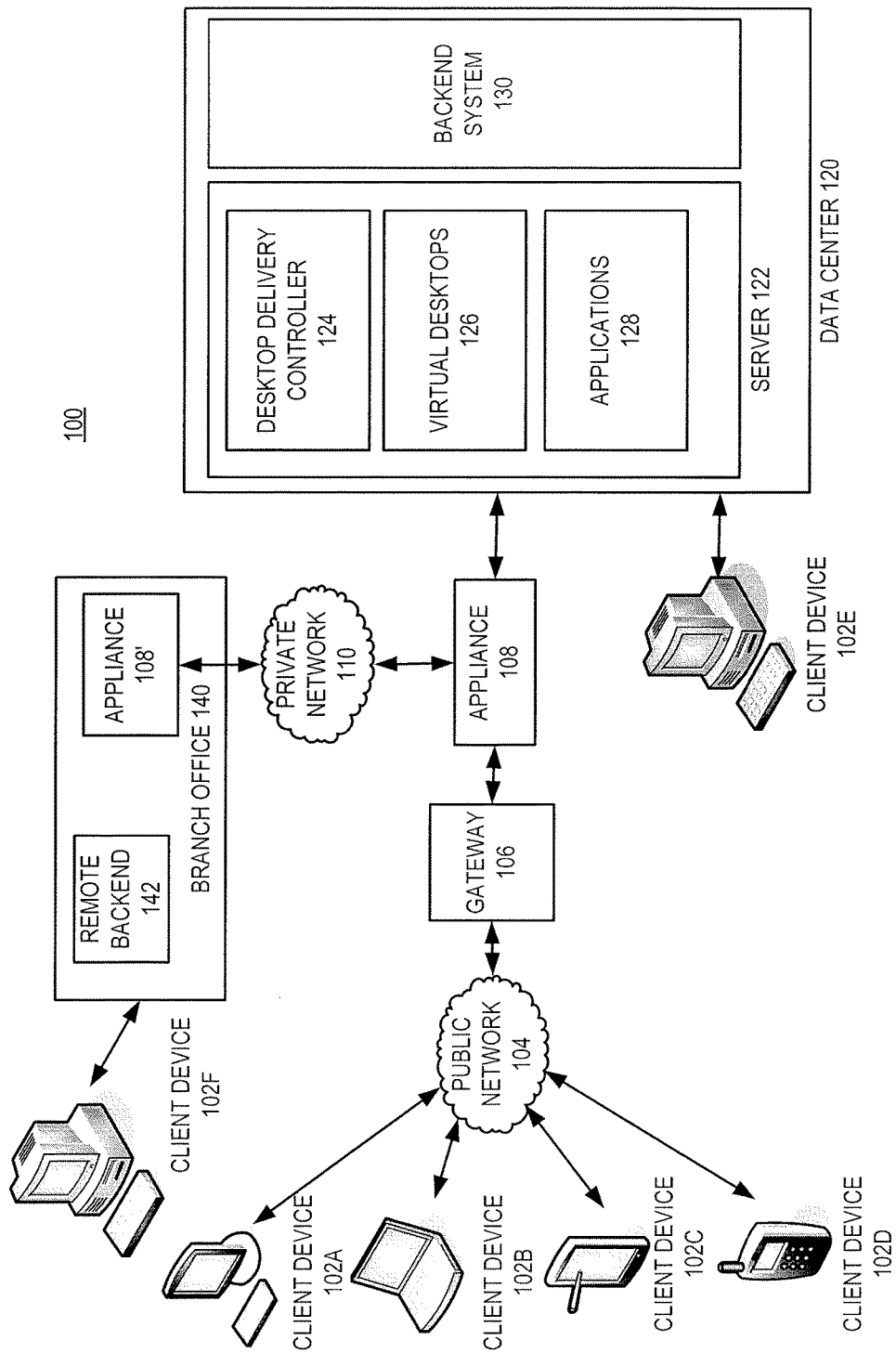
FIG. 1 is a block diagram of an exemplary network environment, consistent with embodiments of the present disclosure.

FIG. 1 is a block diagram of an exemplary network environment 100. While exemplary network environment 100 is directed to a virtual network environment, it is appreciated that the network environment can be any type of network that communicates using packets. Network environment 100 can include one or more client devices 102, a public network 104, a gateway 106, an appliance 108, a private network 110, a data center 120, and a branch office 140.

One or more client devices 102 are devices that can acquire remote services from data center 120 through various means. Client devices 102 can communicate with a data center 120 either directly (e.g., client device 102e) or indirectly through a public network 104 (e.g., client devices 102a-d) or a private network 110 (e.g., client device 102f). When client device 102 communicates through public network 104 or private network 110, a communication link can be established. For example, a link can be established by public network 104, gateway 106, and appliance 108, thereby providing a client device (e.g. client devices 102a-d) access to data center 120. A link can also be established by branch office 140 including appliance 108', private network 110, and appliance 108, thereby providing a client device (e.g. client device 102f) access to data center 120. While client devices 102 are portrayed as a computer (e.g., client devices 102a, 102e, and 102f), a laptop (e.g., client device 102b), a tablet (e.g., client device 102c), and a mobile smart phone (e.g., client device 102d), it is appreciated that client device 102 could be any type of device (e.g., wearable or smart watch) that communicates packets to and from data center 120.

Public network 104 and private network 110 can be any type of network such as a wide area network (WAN), a local area network (LAN), or a metropolitan area network (MAN). As an example, a WAN can be the Internet or the World Wide Web, and a LAN can be a corporate Intranet. Public network 104 and private network 110 can be a wired network or a wireless network.

Gateway 106 is a physical device or is software that is part of a physical device that interfaces between two networks having different protocols. Gateway 106, for example, can be a server, a router, a host, or a proxy server. In some embodiments, gateway 106 can include or be coupled to a firewall separating gateway 106 from public network 104 (e.g., Internet). Gateway has the ability to modify signals received from client device 102 into signals that appliance 108 and/or data center 120 can understand and vice versa.

Appliance 108 is a device that optimizes wide area network (WAN) traffic by including, for example, a quality of service ("QoS") engine. In some embodiments, appliance 108 optimizes other types of network traffic, such as local area network (LAN) traffic, metropolitan area network (MAN) traffic, or wireless network traffic. Appliance 108 can optimize network traffic by, for example, scheduling data packets in an established communication link so that the data packets can be transmitted or dropped at a scheduled time and rate. In some embodiments, appliance 108 is a physical device, such as Citrix System's ByteMobile™, Netscaler™, or CloudBridge™. In some embodiments, appliance 108 can be a virtual appliance. In some embodiments, appliance can be a physical device having multiple instances of virtual machines (e.g., virtual Branch Repeater). In some embodiments, a first appliance (e.g., appliance 108) works in conjunction with or cooperation with a second appliance (e.g., appliance 108') to optimize network traffic. For example, the first appliance can be located between the WAN and a corporate LAN (e.g., data center 120), while the second appliance can be located between a branch office (e.g., branch office 140) and a WAN connection. In some embodiments, the functionality of gateway 106 and appliance 108 can be located in a single physical device. Appliances 108 and 108' can be functionally the same or similar. Moreover, in some embodiments appliance 108 and gateway 106 can be part of the same device. Appliance 108 is further described below corresponding to FIG. 3A.

Data center 120 is a central repository, either physical or virtual, for the storage, management, and dissemination of data and information pertaining to a particular public or private entity. Data center 120 can be used to house computer systems and associated components, such as one or more physical servers, virtual servers, and storage systems. Data center 120 can include, among other things, one or more servers (e.g., server 122) and a backend system 130. In some embodiments data center 120 can include gateway 106, appliance 108, or a combination of both.

Server 122 is an entity represented by an IP address and can exist as a single entity or a member of a server farm. Server 122 can be a physical server or a virtual server. In some embodiments, server 122 can include a hardware layer, an operating system, and a hypervisor creating or managing one or more virtual machines. Server 122 provides one or more services to an endpoint. These services include providing one or more applications 128 to one or more endpoints (e.g., client devices 102a-f or branch office 140). For example, applications 128 can include Microsoft Windows™-based applications and computing resources.

Desktop delivery controller 124 is a device that enables delivery of services, such as virtual desktops 126 to client devices (e.g., client devices 102a-f or branch office 140). Desktop delivery controller 124 provides functionality required to manage, maintain, and optimize all virtual desktop communications.

In some embodiments, the services include providing one or more virtual desktops 126 that can provide one or more applications 128. Virtual desktops 126 can include hosted shared desktops allowing multiple user to access a single shared Remote Desktop Services desktop, virtual desktop infrastructure desktops allowing each user to have their own virtual machine, streaming disk images, a local virtual machine, individual applications (e.g., one or more applications 128), or a combination thereof.

Backend system 130 is a single or multiple instances of computer networking hardware, appliances, or servers in a server farm or a bank of servers and interfaces directly or indirectly with server 122. For example, backend system 130 can include Microsoft Active Directory™, which can provide a number of network services, including lightweight directory access protocol (LDAP) directory services, Kerberos-based authentication, domain name system (DNS) based naming and other network information, and synchronization of directory updates amongst several servers. Backend system 130 can also include, among other things, an Oracle™ backend server, a SQL Server backend, and/or a dynamic host configuration protocol (DHCP). Backend system 130 can provide data, services, or a combination of both to data center 120, which can then provide that information via varying forms to client devices 102 or branch office 140.

Branch office 140 is part of a local area network (LAN) that is part of the WLAN having data center 120. Branch office 140 can include, among other things, appliance 108' and remote backend 142. In some embodiments, appliance 108' can sit between branch office 140 and private network 110. As stated above, appliance 108' can work with appliance 108. Remote backend 142 can be set up in similar manner as backend system 130 of data center 120. Client device 102f can be located on-site to branch office 140 or can be located remotely from branch office 140.

Appliances 108 and 108' and gateway 106 can be deployed as or executed on any type and form of specific computing device (e.g., such as the computing device of FIGS. 2A-2B) capable of communicating on any type and form of network described herein. Appliances 108 and 108' can be deployed individually or as a pair operatively connected together.

Figure 2A:
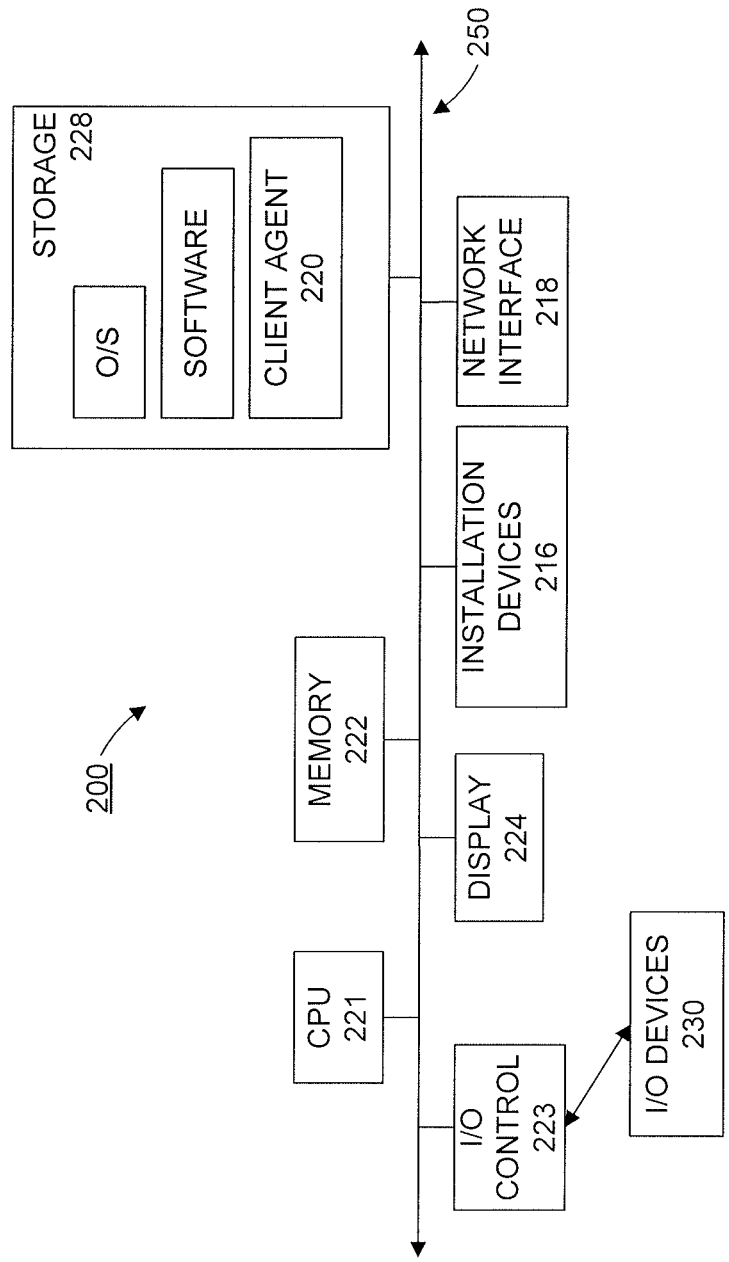
FIGS. 2A-2B are block diagrams of an exemplary computing device, consistent with embodiments of the present disclosure.
Figure 2B:
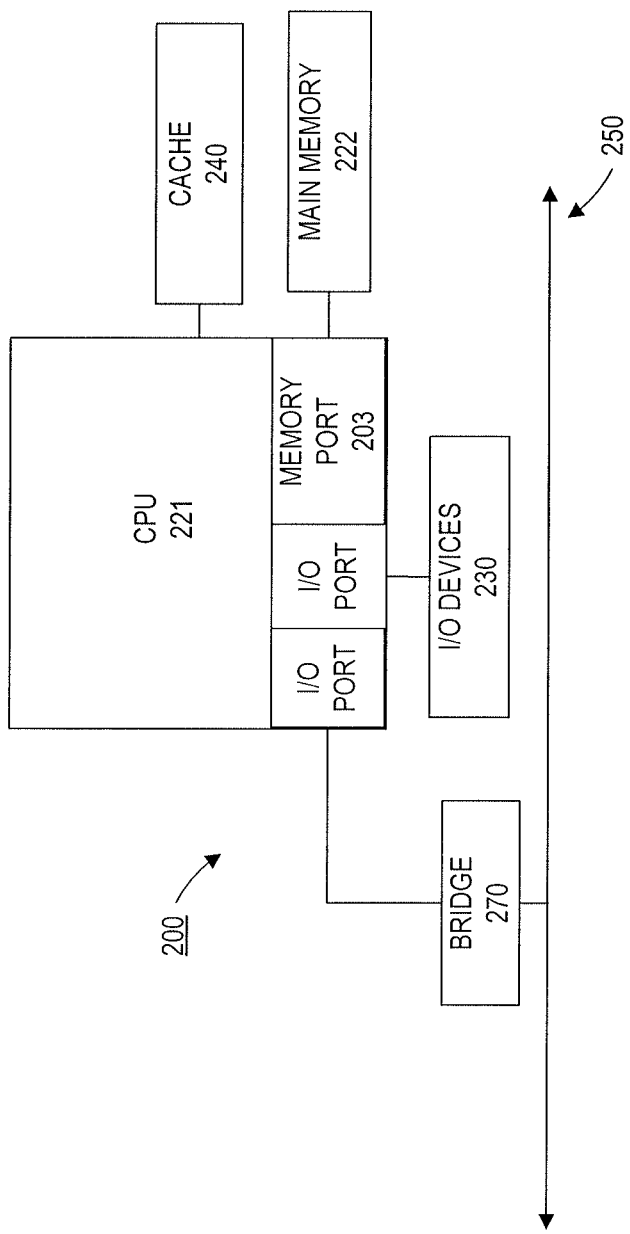

As shown in FIGS. 2A-2B, each computing device 200 includes a central processing unit (CPU) 221 and a main memory 222. CPU 221 can be any logic circuitry that responds to and processes instructions fetched from the main memory 222. CPU 221 can be a single or multiple microprocessors, field-programmable gate arrays (FPGAs), or digital signal processors (DSPs) capable of executing particular sets of instructions stored in a memory (e.g., main memory 222) or cache (e.g., cache 240). The memory includes a tangible and/or non-transitory computer-readable medium, such as a flexible disk, a hard disk, a CD-ROM (compact disk read-only memory), MO (magneto-optical) drive, a DVD-ROM (digital versatile disk read-only memory), a DVD-RAM (digital versatile disk random-access memory), flash drive, flash memory, registers, caches, or a semiconductor memory. Main memory 222 can be one or more memory chips capable of storing data and allowing any storage location to be directly accessed by CPU 221. Main memory 222 can be any type of random access memory (RAM), or any other available memory chip capable of operating as described herein. In the exemplary embodiment shown in FIG. 2A, CPU 221 communicates with main memory 222 via a system bus 250. Computing device 200 can also include a visual display device 224 and an input/output (I/O) device 230 (e.g., a keyboard, mouse, or pointing device) connected through I/O controller 223, both of which communicate via system bus 250. One of ordinary skill in the art would appreciate that CPU 221 can also communicate with memory 222 and other devices in manners other than through system bus 250, such as through serial communication manners or point-to-point communication manners. Furthermore, I/O device 230 can also provide storage and/or an installation medium for the computing device 200.

FIG. 2B depicts an embodiment of an exemplary computing device 200 in which CPU 221 communicates directly with main memory 222 via a memory port 203. CPU 221 can communicate with a cache 240 via a secondary bus (not shown), sometimes referred to as a backside bus. In some other embodiments, CPU 221 can communicate with cache 240 via system bus 250. Cache 240 typically has a faster response time than main memory 222. In some embodiments, such as the embodiment shown in FIG. 2B, CPU 221 can communicate directly with I/O device 230 via an I/O port (not shown). In further embodiments, I/O device 230 can be a bridge 270 between system bus 250 and an external communication bus, such as a USB bus, an Apple Desktop Bus, an RS-232 serial connection, a SCSI bus, a FireWire™ bus, a FireWire 800™ bus, an Ethernet bus, an AppleTalk™ bus, a Gigabit Ethernet bus, an Asynchronous Transfer Mode bus, a HIPPI bus, a Super HIPPI bus, a SerialPlus bus, a SCI/LAMP bus, a FibreChannel™ bus, or a Serial Attached small computer system interface bus, or some other type of data bus.

As shown in FIG. 2A, computing device 200 can support any suitable installation device 216, such as a disk drive or other input port for receiving one or more computer-readable media such as, for example, a USB device, flash drive, SD memory card; a hard-drive; or any other device suitable for installing software and programs such as any client agent 220, or portion thereof. Computing device 200 can further comprise a storage device 228, such as one or more hard disk drives or redundant arrays of independent disks, for storing an operating system and other related software, and for storing application software programs such as any program related to client agent 220. Optionally, any of the installation devices 216 could also be used as storage device 228.

Furthermore, computing device 200 can include a network interface 218 to interface to a LAN, WAN, MAN, or the Internet through a variety of link including, but not limited to, standard telephone lines, LAN or WAN links (e.g., 802.11, T1, T3, 56 kb, X.25), broadband link (e.g., ISDN, Frame Relay, ATM), wireless connections (Wi-Fi, Bluetooth, Z-Wave, Zigbee), or some combination of any or all of the above. Network interface 218 can comprise a built-in network adapter, network interface card, PCMCIA network card, card bus network adapter, wireless network adapter, USB network adapter, modem or any other device suitable for interfacing computing device 200 to any type of network capable of communication and performing the operations described herein.

Figure 3A:
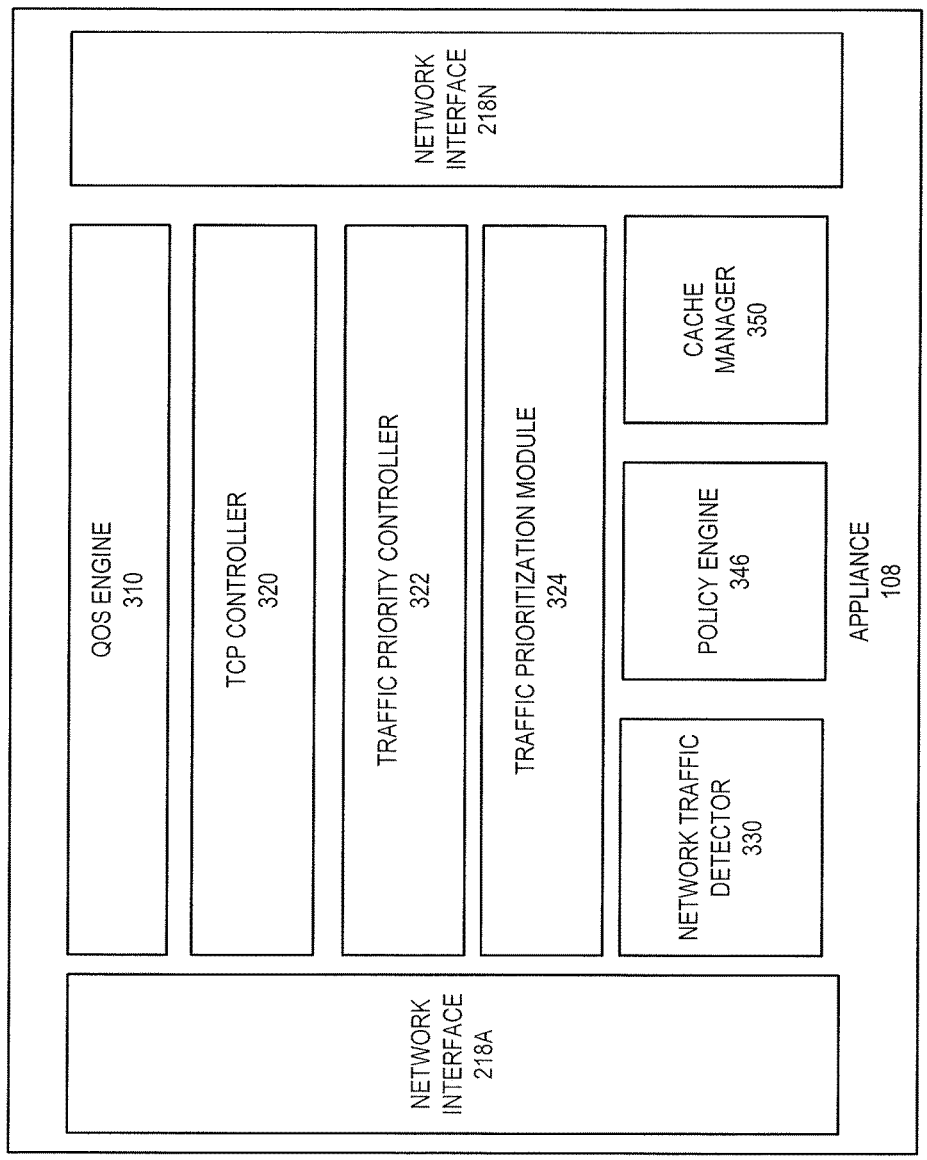
FIG. 3A is a block diagram of an exemplary appliance illustrated in FIG. 1, consistent with embodiments of the present disclosure.

FIG. 3A is a block diagram of an exemplary appliance 108 and/or 108' illustrated in FIG. 1, consistent with embodiments of the present disclosure. Appliance 108 can include one or more network interfaces 218A-N consistent with network interface 218 of FIG. 2A, a QoS engine 310, one or more TCP controllers 320, one or more traffic priority controllers 322, one or more network traffic detectors 330, a policy engine 346, and a cache manager 350. Although FIG. 2A depicts network interfaces 218A-218N as two network interfaces, it is appreciated that interfaces 218A-218N can include any number of network interfaces.

QoS engine 310, which is also referred to as a "QoS controller," or a "QoS packet scheduler," can perform one or more optimization (e.g., Quality of Service "QoS") techniques, including the application of one or more TCP traffic prioritization algorithms, etc. QoS engine 310 can be one or more modules, which can be one or more packaged functional software and/or hardware units designed for use with other components or a part of a program that performs a particular function (e.g., optimization techniques), corresponding to the particular step, of related functions. QoS engine 310 can be configured to improve the performance, operation, or quality of service of any type of network traffic. QoS engine 310 performs these techniques, for example, by using defined logic, business rules, functions, or operations. In some embodiments, QoS engine 310 can perform network traffic optimization and management mechanisms that provide different priorities to different users, applications, flows, or links. QoS engine 310 can also control, maintain, or assure a certain level of performance to a user, application, flow, or connection. QoS engine 310 can direct TCP controller 320 to perform any or all steps for determining one or more congestion windows using one or more TCP characteristics and TCP traffic priority. For example, QoS engine 310 can control, maintain, prioritize and/or assure a certain portion of bandwidth or network capacity of a communication link for a user, application, one or more flows, or links, collect data in connection with one or more flows and links, analyze the collected data, select a TCP flavor suitable for avoiding TCP traffic congestion on the one or more flows.

In some embodiments, QoS engine 310 can monitor the achieved level of performance or the quality of service (e.g., the data rate, delay, dropped packets, etc.) corresponding to a user, application, and/or flow, or link, and then dynamically control or adjust one or more TCP characteristics in connection with sending and receiving data packets to achieve the desired level of performance or quality of service. QoS engine 310 can direct TCP controller 320 to perform some or all of the steps according to exemplary embodiments disclosed herein. For example, QoS engine 310 can coordinate the acquisition and delivery of TCP characteristics between traffic priority controller 322 and TCP controller 320. QoS engine 310 can also coordinate the acquisition and delivery of link characteristics between components of appliance 108, such as, for example, between network traffic detector 330, TCP controller 320, traffic prioritization module 324, and traffic priority controller 322.

TCP controller 320, which is also referred to as a "packet engine," a "packet processor," or a "data processor," is responsible for controlling and managing the processing of data packets received and transmitted by appliance 108 via network interfaces 218A-N. TCP controller 320 can be one or more modules, which can be one or more packaged functional hardware units designed for use with other components or a part of a program that performs a particular function (e.g., controlling and managing the processing of data packets), corresponding to the particular step, of related functions. TCP controller 320 can be embodied as a single packet engine or any number of a plurality of packet engines that can operate at the data link layer (layer 2), network layer (layer 3), or the transport layer (layer 4) of a network stack (e.g., such as the layers and protocols of the Open System Interconnection communications model). TCP controller 320 can be configured to accomplish some or all of the steps described herein after being executed by CPU 221 and/or QoS engine 310. In some aspects, the data packets can be carried over the data link layer via the Ethernet communication protocol, which can comprise any of the family of WAN or LAN protocols, such as those protocols covered by the IEEE 802.3. In other aspects, the network stack can have any type and form of wireless protocols, such as IEEE 802.11 and/or mobile internet protocols. In some embodiments, TCP controller 320 intercepts or receives data packets at the network layer, such as via the IP communication protocol. In some embodiments, TCP controller 320 can intercept or receive data packets at the transport layer, such as via the TCP communication protocols. TCP controller 320 can operate at any session or any application layer above the transport layer.

TCP controller 320 can include a buffer for queuing one or more data packets during processing of the data packets. Additionally, TCP controller 320 can communicate via one or more communication protocols to transmit and receive a plurality of network data packets across one or more links via network interfaces 218A-N. The links can connect appliance 108 to appliance 108'. TCP controller 320 can be configured to acquire data regarding the flow and store, the acquired data in an operatively connected computer memory. The sent and received data packets operating across one or more links can be considered "data flows" or "flows." In some embodiments, TCP controller 320 can send scheduling requests to QoS engine 310 for scheduling of data packets received and stored at TCP controller 320. After TCP controller 320 receives responses from QoS engine 310, TCP controller 320 processes the stored data packets according to their scheduled priorities determined by QoS engine 310, traffic prioritization module 324, and/or traffic priority controller 322. TCP controller 320 can determine one or more TCP characteristics of the flow based on the stored data. A TCP characteristic, as discussed in further detail below, includes a plurality of information such as, for example, packet round trip times and/or the packet loss rate for a particular data flow, an average queuing delay and/or bandwidth delay product for the packets sent and received across a particular link, congestion window drop information, and/or other congestion window information such as congestion window size, among other things.

During operations of appliance 108, TCP controller 320 can interface, be integrated with, or be in communication with any portion of appliance 108, such as QoS engine 310, traffic priority controller 322, traffic prioritization module 322, network traffic detector 330, policy engine 346, and/or cache manager 350. As such, any of the logic, functions, or operations of QoS engine 310, traffic priority controller 322, traffic prioritization module 324, network traffic detector 330, policy engine 346, and/or cache manager 350 can be performed in conjunction with or in responsive to TCP controller 320. TCP controller can be controlled by and/or execute any operation described herein.

In some aspects, one or more traffic priority controllers 322 can be configured to send and receive flow information from TCP controller 320, and/or QoS engine 310. Traffic priority controller 322 can be configured to acquire one or more TCP characteristics from TCP controller 320, acquire one or more flow priorities from traffic prioritization module 324, and determine a congestion window size based on the TCP characteristics and the one or more flow priorities. Because the flow characteristics change with time during the congestion window determination process, the selection is said to be "dynamic." TCP characteristics can include one or more characteristics that change with time, such as, for example, packet round trip times and/or the packet loss rate for a particular data flow, an average queuing delay for the packets sent and received across a particular link, and/or congestion window information. Traffic priority controller 322 can be one or more modules, which can be one or more packaged functional hardware units designed for use with other components or a part of a program that performs a particular function (e.g., controlling and managing the processing of data packets), corresponding to the particular step, of related functions.

Traffic prioritization module 234 can determine one or more relative priorities for each TCP flow. Traffic prioritization module 234 can be one or more modules, which can be one or more packaged functional hardware units designed for use with other components or a part of a program that performs a particular function (e.g., optimization techniques), corresponding to the particular step, of related functions.

One or more network traffic detectors 330 can include any logic, business rules, functions, or operations for automatically detecting the type of network traffic corresponding to data packets acquired by TCP controller 320. Network traffic detector 330 can be one or more modules, which can be one or more packaged functional hardware units designed for use with other components or a part of a program that performs a particular function (e.g., acquire one or more link characteristics), corresponding to the particular step, of related functions. As described above, TCP controller 320 can store and transmit data packets from any type of network traffic, such as data packets from any communication protocols including WAN, MAN, LAN, and wireless communication protocols. In some embodiments, not all network traffic is optimized by QoS engine 310. For example, QoS engine 310 can be used to optimize the WAN traffic, but not the LAN traffic or traffic directed to management. Network traffic detector 330 can detect the type of network traffic received at TCP controller 320 by any available techniques, such as by using IP addresses. Network traffic detectors 330 can also determine a link type, a bandwidth, and/or other characteristics associated with one or more flows.

Appliance 108 can also include a policy engine 346, also referred to as a policy controller or a policy provider. Policy engine 346 can include any logic, function, or operations for providing and applying one or more policies or rules to the function, operation, or configuration of any portion of the appliance 108. Policy engine 346 can be one or more modules, which can be one or more packaged functional hardware units designed for use with other components or a part of a program that performs a particular function, corresponding to the particular step, of related functions. In some embodiments, policy engine 346 provides a configuration mechanism to allow a user to identify, specify, define, or configure a policy for appliance 108, or any portion thereof. For example, policy engine 346 can provide a predefined traffic optimization configuration policy including the number of priorities, the priorities associated with each service class, the number of connections allowed under each service class, link bandwidth configuration, and any other policy information. Policy engine 346 can also provide policies for what data to cache, when to cache the data, for whom to cache the data, when to expire an object in cache, or when to refresh the cache. Policy engine 346 can also include any logic, rules, functions, or operations for determining and providing access, control, and management of data packets received and stored by TCP controller 320. Policy engine 346 can also include any logic, rules, functions, or operations for determining and providing access, control and management of security, network traffic, network access, compression, or any other function or operation performed by appliance 108.

Cache manager 350 can include software, hardware, or any combination of software and hardware to store data, information, and objects to a cache in memory or storage; to provide cache access; and to control and manage the cache. The data, objects, or content processed and stored by cache manager 350 can include data in any format, such as a six-byte MAC address, a TCP data packet, or any type of data communicated via any communication protocol. Examples of types of data can include, for example, one or more TCP characteristics including information in connection with packet loss rates, queuing delays, flow congestion, sizes of congestion windows, bandwidth of one or more links, average round trip times, etc. Cache manager 350 can duplicate original data stored in a slow-access storage and store the data in a fast-access cache memory, such as cache 240. After the data is stored in the cache, future use can be made by accessing the cached copy rather than refetching or recomputing the original data, thereby reducing the access time. In some embodiments, the cache can comprise a data object in memory of appliance 108. In some embodiments, the cache can comprise any type and form of storage element of appliance 108, such as a portion of a hard disk. In some embodiments, as described above, the processing unit of the device, such as CPU 221, can provide cache memory for use by cache manager 350. Cache manager 350 can use any portion and combination of main memory 222, storage 228, or CPU 221 for caching data, objects, and other content. Cache manager 350 can comprise any type of general purpose processor (GPP), or any other type of integrated circuit, such as a Field Programmable Gate Array (FPGA), Programmable Logic Device (PLD), or Application Specific Integrated Circuit (ASIC). Cache manager 350 can be one or more modules, which can be one or more packaged functional hardware units designed for use with other components or a part of a program that performs a particular function, corresponding to the particular step, of related functions.

FIG. 3B is a block diagram of a portion of exemplary appliance 108 illustrated in FIG. 3A, consistent with embodiments of the present disclosure. In some embodiments, the operating system of appliance 108 allocates, manages, or otherwise segregates the available system memory into what is referred to as kernel space (system space) and user space (application space). The kernel space is typically reserved for running the kernel, including any device drivers, kernel extensions, or other kernel related software. The kernel can be the core of the operating system, and provides access, control, and management of resources and hardware-related elements of the appliance 108. In some aspects, the kernel space can also include a number of network services or processes working in conjunction with QoS engine 310, TCP controller 320, traffic priority controller 322, traffic prioritization module 324, or any portion thereof. Additionally, the embodiments of the kernel can depend on the operating system installed, configured, or otherwise used by appliance 108.

User space is the memory area or portion of the operating system used by user mode applications or programs otherwise running in user mode. A user mode application cannot access kernel space directly and uses service calls to access kernel services. The operating system uses the user space for executing or running applications and provisioning of user level programs, services, processes, and/or tasks. As an example, the operating system can execute software of network interfaces 218A-N in the user space.

Figure 4:
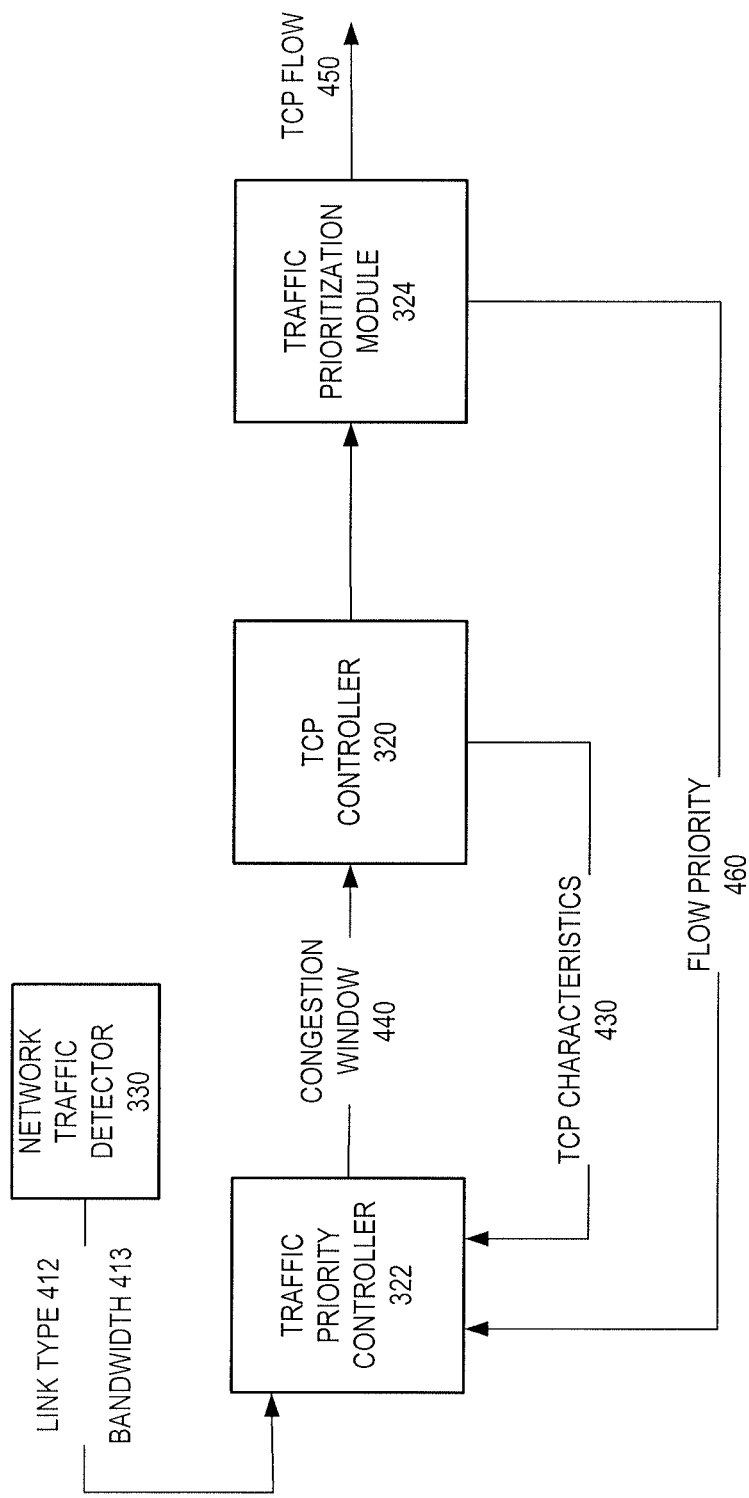
FIG. 4 is a block diagram of an exemplary embodiment for determining a congestion window, consistent with embodiments of the present disclosure.

FIG. 4 is a block diagram of an exemplary embodiment for determining a congestion window 440, consistent with embodiments of the present disclosure. Traffic priority controller 322 can be configured to receive both static input and dynamic input, and use both inputs to determine a congestion window 440. Static input can include one or more TCP link characteristics that include information regarding one or more links across which one or more flows 450 are operating. Examples of a TCP link characteristic can include bandwidth information (e.g., bandwidth 413), link type (e.g., 412), and/or the number of active TCP connections, among other things, between two link terminals (e.g., between appliance 108 and appliance 108'). TCP characteristics 430 can also include dynamically-changing information in connection with packet loss rates, queuing delays, flow congestion, sizes of congestion windows, average round trip times, and/or other information in connection with active flow 450. A flow is "active" when packets are being sent and received across a TCP link.

In TCP connections, the congestion window is one of the factors used to determine the number of bytes that can be outstanding in an active flow at a given time. Congestion windows are also a means of stopping a link between two link terminals from being overloaded with too much traffic. The congestion window size can be determined by estimating how much TCP packet congestion there is between the two link terminals. The data sender generally maintains and determines the congestion window size. According to some embodiments, an intelligent feedback based system can provide enhanced throughput and QoS for very high priority (P1) traffic during network congestion.

Referring now to FIG. 4, an exemplary traffic priority controller 322 can be configured to control the congestion window size of proxied TCP links based on a flow priority and dynamically-changing TCP characteristics. The TCP characteristics can be derived empirically from a sampled list of previously seen long-lived TCP links by recording the congestion related parameters for each sampled flow. In some aspects, appliance 108 can improve network speed, efficiency and quality of service by determining a congestion window that avoids packet loss of high priority traffic due to traffic congestion.

Traffic priority controller 322 can acquire feedback signals from TCP controller 320 and traffic prioritization module 324. After detecting early congestion based on TCP characteristics 430 and flow priority 460, traffic priority controller 322 can control the least priority TCP traffic by reducing the flow throughput of the non-priority traffic. By slowing non-priority traffic, appliance 108 can avoid congestion for P1 flows and provide additional throughput and decreased packet loss for the P1 traffic.

According to some embodiments, traffic priority controller 322 can predict early congestion in the leased line links. In some aspects, for every P1 flow detected by traffic priority controller 322 for early congestion, appliance 108 can reduce the congestion window size of a non-P1 connection. In the event that traffic priority controller 322 still detects early congestion for the same P1 connection, it can rate limit another non-P1 flow, and can be further extrapolated for 'n' number of additional P1 connections. According to some embodiments, appliance 108 can also ensure that the non-P1 traffic is not starved by ensuring that the congestion window of non-P1 flows are reduced by a predetermined maximum value only once during a predetermined interval of time. For example, non-P1 flows can be reduced by a predetermined value of x packets every 100 round trip times (RTTs).

In some aspects, TCP controller 320 is configured to send and receive a plurality of data packets via a flow operating across a leased line link, and store flow information indicative of various operational aspects of the flow in an operatively connected computer memory (e.g., main memory 222). TCP controller 320 can determine one or more link characteristics using link information (e.g., link type 412 and/or bandwidth 413), and determine one or more TCP characteristics for the flow using the flow information and link characteristics.

According to some embodiments, one or more processors (e.g., CPU 221) can execute traffic priority controller 322. Traffic priority controller 322 can then acquire TCP characteristics 430 (which are dynamically changing over time), receive static input (which does not change over time), and select a congestion window 440 based on the static input and/or dynamic input. For example, traffic priority controller 322 can acquire one or more TCP characteristics 430 from TCP controller 320, acquire one or more flow priorities 460 from traffic prioritization module 324, acquire one or more link characteristics (e.g., link type 412 and/or bandwidth 413) from network traffic detector 330, and determine a congestion window 440 based on the acquired inputs.

In some aspects, TCP controller 320 can continually monitor the traffic for a predetermined period of time, and continually provide dynamic feedback to traffic priority controller 322. Although a predetermined period of time can vary based on application, it is contemplated that TCP controller 320 can monitor traffic for periods of several seconds to periods of time spanning several minutes before calculating TCP characteristics 430.

Using link characteristics and TCP characteristics 430, appliance 108 can estimate the amount of data that could be pushed to the network when the connection starts without causing congestion, and better gain of throughput for each flow while being TCP fair to other flows operating across the active links. By changing the congestion window 440 for the active non-P1 TCP flows, presently disclosed embodiments can reduce the total number P1 traffic packet drops, maintain and/or increase P1 traffic throughput, and maintain a minimum threshold of non-P1 traffic throughput. In some aspects, appliance 108 can provide greater P1 traffic throughput, fewer P1 lost packets, and an improved user experience due to system speed and stability.

Figure 5:
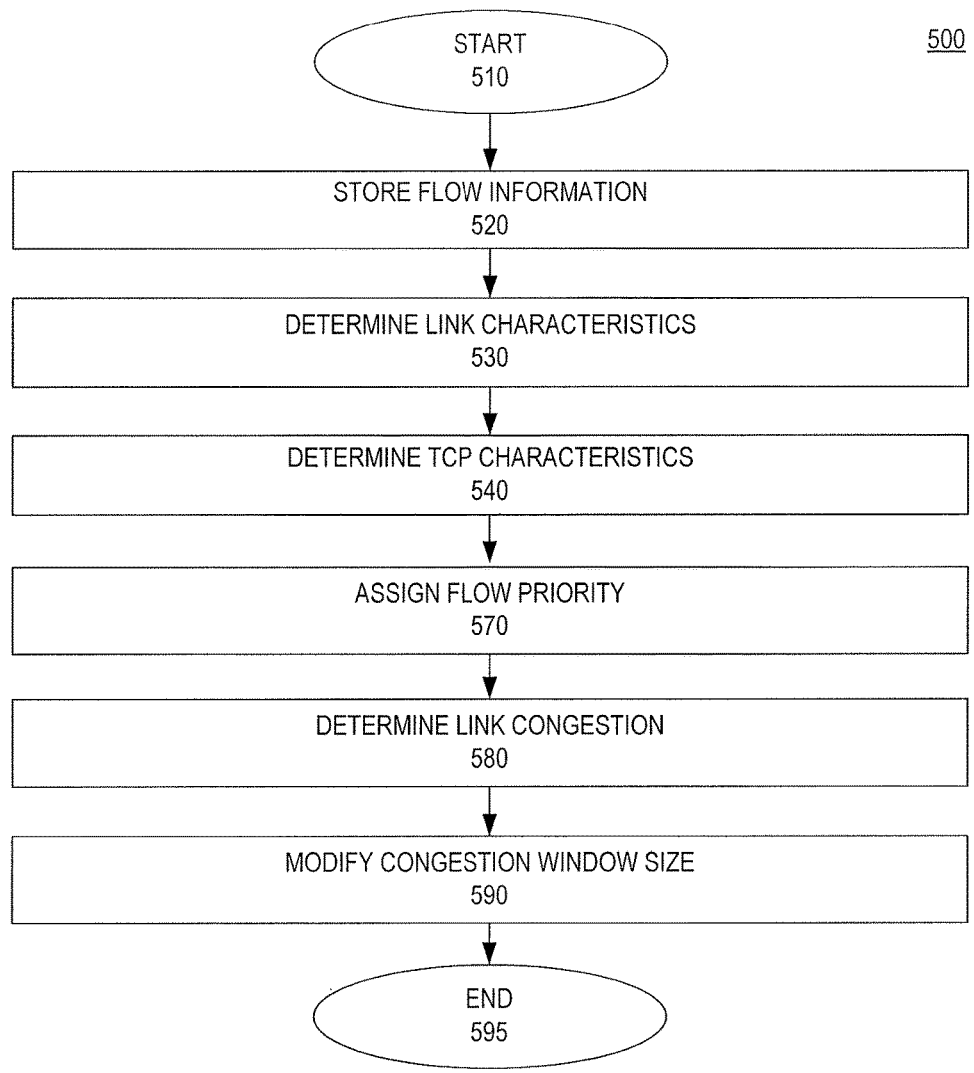
FIG. 5 is a flowchart representing an exemplary method of modifying a flow, consistent with embodiments of the present disclosure.

FIG. 5 is a flowchart representing an exemplary method 500 for modifying a flow, consistent with embodiments of the present disclosure. It will be readily appreciated that the illustrated procedure can be altered to delete steps or further include additional steps. While method 500 is described as being performed by an appliance (e.g., appliance 108), it is appreciated that method 500 can be performed by other devices alone or in combination with the appliance. After an initial start step 510, appliance 108 sends and receives a plurality of data packets comprising an active flow that are operating across a link between two link terminals (e.g., between appliance 108 and appliance 108'). At step 520, appliance 108 can acquire and store information regarding the active flow to an operatively connected computer-readable memory.

According to some embodiments, appliance 108 can also determine link characteristics indicative of the link across which the active flows are operating (step 530). The link can be, for example, a broadband link, a dedicated leased-line link between two dedicated apparatuses (e.g., appliance 180 and appliance 180'), and/or other types of links across which active flow 450 operates. Link characteristics can include information indicative of the link (e.g., link type 412) and/or bandwidth information (e.g., bandwidth 413). It is contemplated that appliance 108 can acquire link characteristics using network traffic detector 330, or any other operatively configured module on the appliance.

Figure 6:
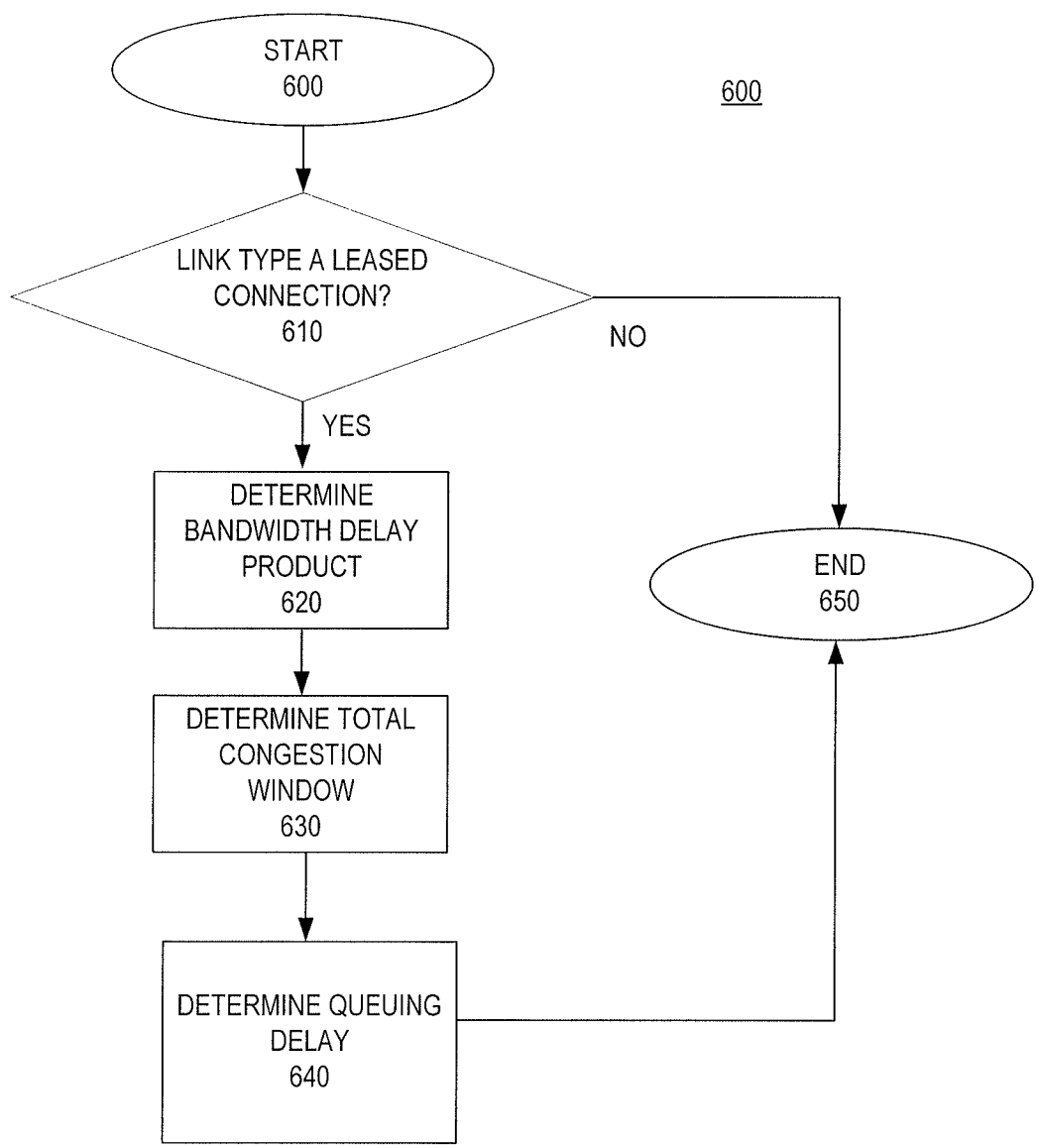
FIG. 6 is a flowchart representing an exemplary method of determining a TCP characteristic, consistent with embodiments of the present disclosure.

According to some embodiments, appliance 108 can determine TCP characteristics (step 540) based on the stored flow data. FIG. 6 considers an exemplary method 600 for determining TCP characteristics (e.g., TCP characteristics 430).

Referring now to FIG. 6, an exemplary method 600 for determining TCP characteristics is described, consistent with embodiments of the present disclosure. After an initial starting step 600, appliance 108 can determine information about the link type, determine information about the flow, and determine aspects of the TCP traffic and operation of the TCP link. For example, at step 610, appliance 108 can determine, based on the link characteristics, whether the active link is a "leased" (proxied) type connection between known end points. If appliance 108 determines that the link type is not a leased connection, method 600 terminates at step 650. If the link type is a leased line type link, method 600 can proceed to step 620. In some embodiments, determination step 610 may not be included as the end points between the leased link are already known.

At step 620, appliance 108 can determine an average bandwidth delay product ($BDP_{avg}$) for the average round trip time ($RTT_{avg}$) of active flow 450. The $BDP_{avg}$ determination considers bandwidth (B) of a link, and average round trip time ($RTT_{avg}$) for the plurality of packets recently sent and received by TCP controller 320 across a particular link. $BDP_{avg}$ is determined by $$BDP_{avg} = B * RTT_{avg},$$

where B is a bandwidth of the link (e.g., bandwidth 413), and $RTT_{avg}$ is the average round trip time for the plurality of data packets operating across the link during the predetermined time interval. While the determination of the average bandwidth delay product can involve a calculation (as shown above), it is appreciated that the determination can involve other mechanisms, such as using a look-up table based on inputs B and $RTT_{avg}$.

At step 630, appliance 108 can determine a total congestion window ("$cwnd_{total}$") for each active flow. A total congestion window gives the sum of all current congestion window sizes for each of the active flows. At step 630, appliance 108 can cause TCP controller 320 to determine a total congestion window ("$cwnd_{total}$"), where $$cwnd_{total} = cwnd_{current\_1} + cwnd_{current\_2} + \ldots cwnd_{current\_n}.$$

Each respective value "$cwnd_{current\_n}$" is an active congestion window of the flow operating across the TCP link. The total congestion window provides an approximate value for the total number of packets occupying an active link at any given time. While the determination of the total congestion window can involve a calculation (as shown above), it is appreciated that the determination can involve other mechanisms, such as using a look-up table.

According to some embodiments, at step 640, appliance 108 may also determine a queuing delay ($d_q$) for the packets sent and received for flow 450. A value for $d_q$ is determined by:

$$d_q = RTT_{current} - RTT_{low} \text{ for } d_q > 0,$$

where $RTT_{current}$ is the round trip time currently experienced for a particular flow, and $RTT_{low}$ is the shortest round trip time experienced by the plurality of packets sent and received by TCP controller 320 during the predetermined time interval. Appliance 108 calculates values for $d_q$ for each of a plurality of active flows. While the determination of the queuing delay can involve a calculation (as shown above), it is appreciated that the determination can involve other mechanisms. According to some embodiments, appliance 108 also determines the approximate number of packets queued for each particular flow for a maximum segment size (MSS), where:

$$\text{the number of packets queued} = (B*d_q)/MSS.$$

Referring again to FIG. 5, after appliance 108 determines TCP characteristics 430 and link characteristics, appliance 108 can assign one or more flow priorities at traffic prioritization module 324 (step 550), which are fed back to traffic priority controller 322. Traffic priority controller 322 can determine link congestion (step 560) for the active TCP link using the values for $BDP_{avg}$ with $cwnd_{total}$, $d_q$, and the number of packets queued. For example, if the queuing delay or the number of packets queued in the network for a P1 flow is high, (e.g., greater than 100 packets), appliance 108 can determine that early congestion is imminent for the P1 flow. As another example, if the number of packets sent and received is substantially near or equal to the BDP of the network pipe (e.g., if $cwnd_{total}$ becomes just greater than $BDP_{avg}$), apparatus 108 may detect that early congestion is imminent for the P1 flow. When early congestion is detected for P1 traffic, it means a packet drop is going to occur in the near future. Since the network link would be occupied with more of P1 traffic, the probability that the packet drop would occur for the P1 traffic tends to be much higher than the probability of packet drop for non-P1 traffic.

According to some embodiments, after appliance 108 has determined early link congestion for P1 traffic, appliance 108 can modify congestion window size (step 570) by reducing the congestion window size for non-P1 traffic by, for example, a predetermined number or percentage. For example, appliance 108 can reduce non-P1 congestion windows by half, and thus, allow P1 traffic to surpass the congestion.

According to some embodiments, at step 570, appliance 108 can determine a size for congestion window 440 using dynamically-changing link characteristics fed back from TCP controller 320, and the flow priority fed back from traffic prioritization module 324. The following abstraction is an exemplary algorithm for predicting early congestion and determining a congestion window based on dynamic feedback from TCP controller 320:

---

Congested_P1_Connection_number = 0;
/*Count total congested P1 connections*/
for all P1 TCP connection
    if (((B*$d_q$)/MSS > 100 packets) && ($cwnd_{total}$ > $BDP_{avg}$))
        Congested_P1_Connection_number++;
/*Find equivalent no. of non-P1 connection whose cwnd is not reduced for previous 100 RTTs */
for all non-P1 TCP connections
    if not visited for previous 100 RTTs
        Congested_P1_Connection--;
        Mark for reduction;
        Mark as visited;
/*Indicate to reduce cwnd of non-P1 TCP connection marked for reduction*/
for each marked for reduced "Congested_P1_Connection_number" non-P1 connection
    cwnd = cwnd/2;

---

Based on the above exemplary algorithm, traffic priority controller 322 can predict early congestion and determine the congestion window size for the non-P1 TCP connections based on a dynamically changing link characteristic provided by TCP controller 320 and flow priority 460 provided by traffic prioritization module 324. Method 500 completes at step 580.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the embodiments disclosed herein. It is intended that the specification and examples be considered as exemplary only. It is also intended that the sequence of steps shown in figures are only for illustrative purposes and are not intended to be limited to any particular sequence of steps. As such, those skilled in the art can appreciate that these steps can be performed in a different order while implementing the same method.

What is claimed is:

1. A first appliance for optimizing network traffic, comprising:
    a quality of service (QoS) packet scheduler, executable on one or more processors, coupled to memory, and configured to schedule transmission of a plurality of active data-packet flows over a link, wherein the link is a proxied link between the first appliance and a second appliance;
    a traffic prioritization module executable on the one or more processors and configured to assign a flow priority to a flow of the plurality of active data-packet flows over the link;
    a traffic priority controller executable on the one or more processors and configured to detect congestion is to occur on the link and responsive to the detection that congestion is to occur, determine a congestion window size for the flow based on at least a number of the plurality of active-data packet flows with the flow priority greater than a predetermined priority and a total congestion window size of the plurality of active-data packet flows greater than a product of a bandwidth and a delay of the link; and a TCP controller executable on the one or more processors and configured to:
acquire a plurality of data packets corresponding to the flow,
queue the plurality of data packets, and
release the plurality of queued data packets based on instructions received from the QoS packet scheduler and the congestion window.

2. The first appliance of claim 1, wherein the flow priority includes a first priority flow having a higher priority and a second priority flow having a lower priority.

3. The first appliance of claim 2, wherein a congestion window for the first priority flow is larger than a congestion window for the second priority flow.

4. The first appliance of claim 1, wherein the traffic priority controller is further configured to determine a plurality of congestion windows for the plurality of active data-packet flows operating across the link.

5. The first appliance of claim 4, wherein the traffic priority controller is further configured to:
determine a total number of congested first priority flows from the plurality of active data-packet flows;
determine a total number of congested second priority flows from the plurality of active data-packet flows; and
modify the congestion window size for the flow based on the congested first priority flows and the congested second priority flows.

6. The first appliance of claim 1, wherein the traffic priority controller is further configured to determine link characteristics comprising a link type and a bandwidth of the link.

7. The first appliance of claim 6, wherein the traffic priority controller is further configured to:
evaluate a bandwidth delay product for the plurality of data packets sent and received via the flow;
evaluate a queuing delay for the flow; and
determine the total congestion window size for the plurality of active data-packet flows.

8. A method for optimizing network traffic over a link between a first appliance and a second appliance, the method performed by the first appliance and comprising:
acquiring, at a TCP controller of the first appliance, plurality of data packets corresponding to a flow of a plurality of active data-packet flows over the link, wherein the link is a proxied link between the first appliance and a second appliance;
queueing the plurality of data packets;
assigning a flow priority to the flow;
detecting congestion is to occur on the link;
determining, at a traffic priority controller of the first appliance responsive to detecting congestion is to occur, a congestion window size for the flow based on at least a number of the plurality of active-data packet flows with the flow priority greater than a predetermined priority and a total congestion window size of the plurality of active-data packet flows greater than a product of a bandwidth and a delay of the link; and
releasing, at the TCP controller of the first appliance, the plurality of queued data packets based on the congestion window and instructions received from a quality of service (QoS) packet scheduler that schedules the transmission of the plurality of active data-packet flows over the link.

9. The method of claim 8, wherein the flow priority includes a first priority flow having a higher priority and a second priority flow having a lower priority.

10. The method of claim 9, wherein a congestion window for the first priority flow is larger than a congestion window for the second priority flow.

11. The method of claim 8, further comprising determining a plurality of congestion windows for the plurality of active data-packet flows operating across the link.

12. The method of claim 11, further comprising:
determining a total number of congested first priority flows from the plurality of active data-packet flows;
determining a total number of congested second priority flows from the plurality of active data-packet flows; and
modifying the congestion window size for the flow based on the congested first priority flows and the congested second priority flows.

13. The method of claim 8, further comprising determining link characteristics comprising a link type and a bandwidth of the link.

14. The method of claim 13, further comprising:
evaluating a bandwidth delay product for the plurality of data packets sent and received via the flow;
evaluating a queuing delay for the flow; and
determining the total congestion window size for the plurality of active data-packet flows.

15. A non-transitory computer readable storage medium that stores a set of instructions that are executable by at least one processor of a first appliance to cause the first appliance to perform a method for optimizing network traffic over a link between the first appliance and a second appliance, the method comprising:
acquiring, at a TCP controller of the first appliance, a plurality of data packets corresponding to a flow of a plurality of active data-packet flows over the link, wherein the link is a proxied link between the first appliance and the second appliance;
queueing the plurality of data packets;
assigning a flow priority to the flow;
detecting congestion is to occur on the link;
determining, at a traffic priority controller of the first appliance responsive to detecting congestion is to occur, a congestion window size for the flow based on at least a number of the plurality of active-data packet flows with the flow priority greater than a predetermined priority and a total congestion window size of the plurality of active-data packet flows greater than a product of a bandwidth and a delay of the link; and
releasing, at the TCP controller of the first appliance, the plurality of queued data packets based on the congestion window and instructions received from a quality of service (QoS) packet scheduler that schedules the transmission of the plurality of active data-packet flows over the link.

16. The non-transitory computer readable storage medium of claim 15, wherein the flow priority includes a first priority flow having a higher priority and a second priority flow having a lower priority.

17. The non-transitory computer readable storage medium of claim 16, wherein a congestion window for the first priority flow is larger than a congestion window for the second priority flow.

18. The non-transitory computer readable storage medium of claim 17, wherein the set of instructions that are executable by the at least one processor of the first appliance to cause the first appliance to further perform:

determining a total number of congested first priority flows from the plurality of active data-packet flows;
determining a total number of congested second priority flows from the plurality of active data-packet flows; and
modifying the congestion window size for the flow based on the congested first priority flows and the congested second priority flows.

* * * * *